(12) United States Patent
Sahai

(10) Patent No.: US 7,091,825 B2
(45) Date of Patent: Aug. 15, 2006

(54) METHOD AND SYSTEM FOR VEHICLE CONTROL USING WALKIE-TALKIE TYPE CELLULAR PHONE

(76) Inventor: Anil K. Sahai, 709 White Post Dr., Webster City, IA (US) 50595

( * ) Notice: Subject to any disclaimer, the term of this patent is extended or adjusted under 35 U.S.C. 154(b) by 114 days.

(21) Appl. No.: 10/791,523

(22) Filed: Mar. 1, 2004

(65) Prior Publication Data

US 2005/0190041 A1    Sep. 1, 2005

(51) Int. Cl.
*H04Q 9/00* (2006.01)
*H04Q 7/00* (2006.01)
*H04Q 7/20* (2006.01)
*G08C 19/00* (2006.01)
*G10K 11/00* (2006.01)

(52) U.S. Cl. .................. 340/5.72; 340/5.62; 340/5.64; 340/5.84; 340/7.1; 340/825.69; 340/825.72; 455/403; 455/420; 455/550.1; 455/556.1; 455/563; 455/90.2; 367/198

(58) Field of Classification Search ............... 340/5.72, 340/5.62, 5.64, 5.84, 7.1, 825.69, 825.72; 455/403, 420, 550.1, 556.1, 563, 90.2; 367/198

See application file for complete search history.

(56) References Cited

U.S. PATENT DOCUMENTS

| | | | |
|---|---|---|---|
| 5,515,043 A * | 5/1996 | Berard et al. | 340/988 |
| 6,549,130 B1 * | 4/2003 | Joao | 307/10.2 |
| 6,825,875 B1 * | 11/2004 | Strub et al. | 348/207.99 |
| 2003/0231550 A1 * | 12/2003 | Macfarlane | 367/198 |
| 2005/0137877 A1 * | 6/2005 | Oesterling et al. | 704/275 |

* cited by examiner

*Primary Examiner*—Jeffery Hofsass
*Assistant Examiner*—Scott Au
(74) *Attorney, Agent, or Firm*—McKee, Voorhees & Sease, P.L.C.

(57) ABSTRACT

A method and system for controlling vehicle functions using a walkie-type cellular phone is provided. A cellular phone is used to make a walkie-talkie type connection with a device disposed within a vehicle. The cellular phone sends a message to a receiver of the device disposed with the vehicle. The message instructs the device on how to control the vehicle. The device is electrically connected to one or more vehicle controls of the vehicle.

14 Claims, 2 Drawing Sheets

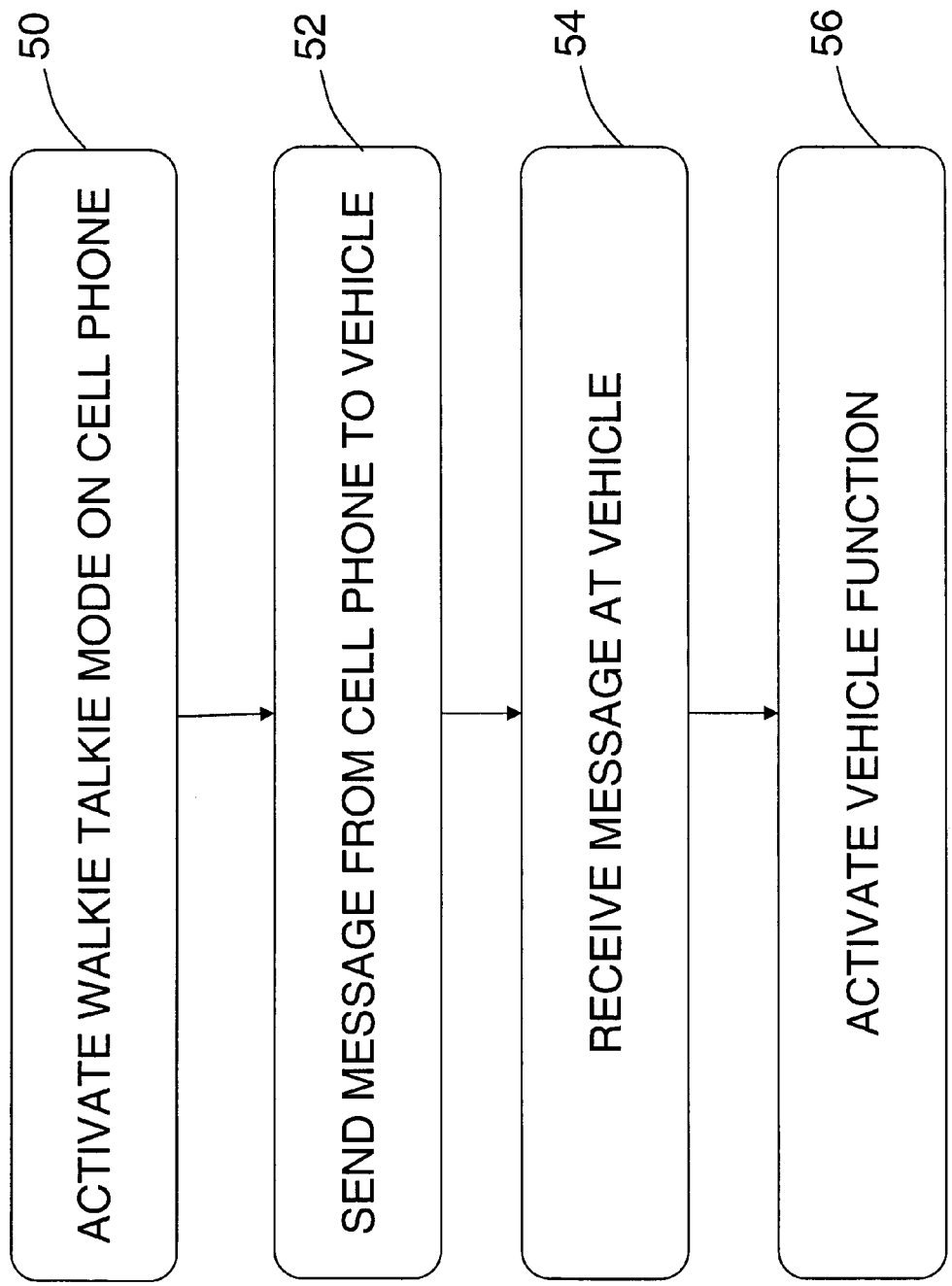

METHOD AND SYSTEM FOR VEHICLE CONTROL USING WALKIE-TALKIE TYPE CELLULAR PHONE

BACKGROUND OF THE INVENTION

The present invention relates to controlling of vehicle functions using a cellular telephone. More particularly, but not exclusively, the present invention relates to the controlling of vehicle functions using a cellular telephone having a walkie-talkie mode.

It is becoming more common for cellular telephones to include a walkie-talkie type function also known as a push-to-talk function. This type of functionality is present in phones offered by various service providers, including Nextel, Sprint, and Verizon. One of the advantages of this type of feature is that it can more quickly establish a connection and does not require that the receiving party answer the phone. Instead the phone call can be immediately received and broadcast over a speaker of the phone.

The present invention recognizes that this same type of walkie-talkie functionality can be used to control vehicle functions. Thus, one need not remove their keys from their car. Instead, they can simply use their cell phone to lock doors, turn on lights, perform a remote start, open a trunk or hood, activate an alarm system, or perform other vehicle functions.

SUMMARY OF THE INVENTION

The present invention provides a method and system for controlling vehicle functions using a cellular phone. A cellular phone is used to make a walkie-talkie type connection with a device disposed within a vehicle. The cellular phone sends a message to a receiver of the device disposed with the vehicle. The message instructs the device on how to control the vehicle. The device is electrically connected to one or more vehicle controls of the vehicle. Thus, the messages sent over the cell phone are used to control vehicle functions.

According to one aspect of the invention, a method for remotely controlling vehicle functions using a cell phone is disclosed. The method includes activating a walkie-talkie mode on the cell phone, selecting a vehicle function to be controlled on a vehicle. Next, according to the method, a message is sent from the cell phone to a receiver associated with the vehicle. The message is received at the receiver associated with the vehicle, thus activating the vehicle function. The vehicle function can be a vehicle light function, a vehicle lock function, an ignition function, a trunk release function, a vehicle alarm function, or other type of vehicle function.

According to another aspect of the invention, a system for remotely controlling vehicle functions using a cell phone is disclosed. The system includes a vehicle and at least one cell phone adapted to establish walkie-talkie type connections. There is a receiver unit disposed within the vehicle, the receiver unit comprising a receiver adapted to receiver walkie-talkie communications from the at least one cell phone. There is also an intelligent control operatively connected to the receiver for receiving vehicle function control messages. The intelligent control operatively connected to one or more vehicle controls such that the intelligent control can control vehicle functions.

BRIEF DESCRIPTION OF THE DRAWINGS

FIG. 2 is flow chart showing one embodiment of the methodology of the present invention.

DETAILED DESCRIPTION OF A PREFERRED EMBODIMENT

Figure 1:
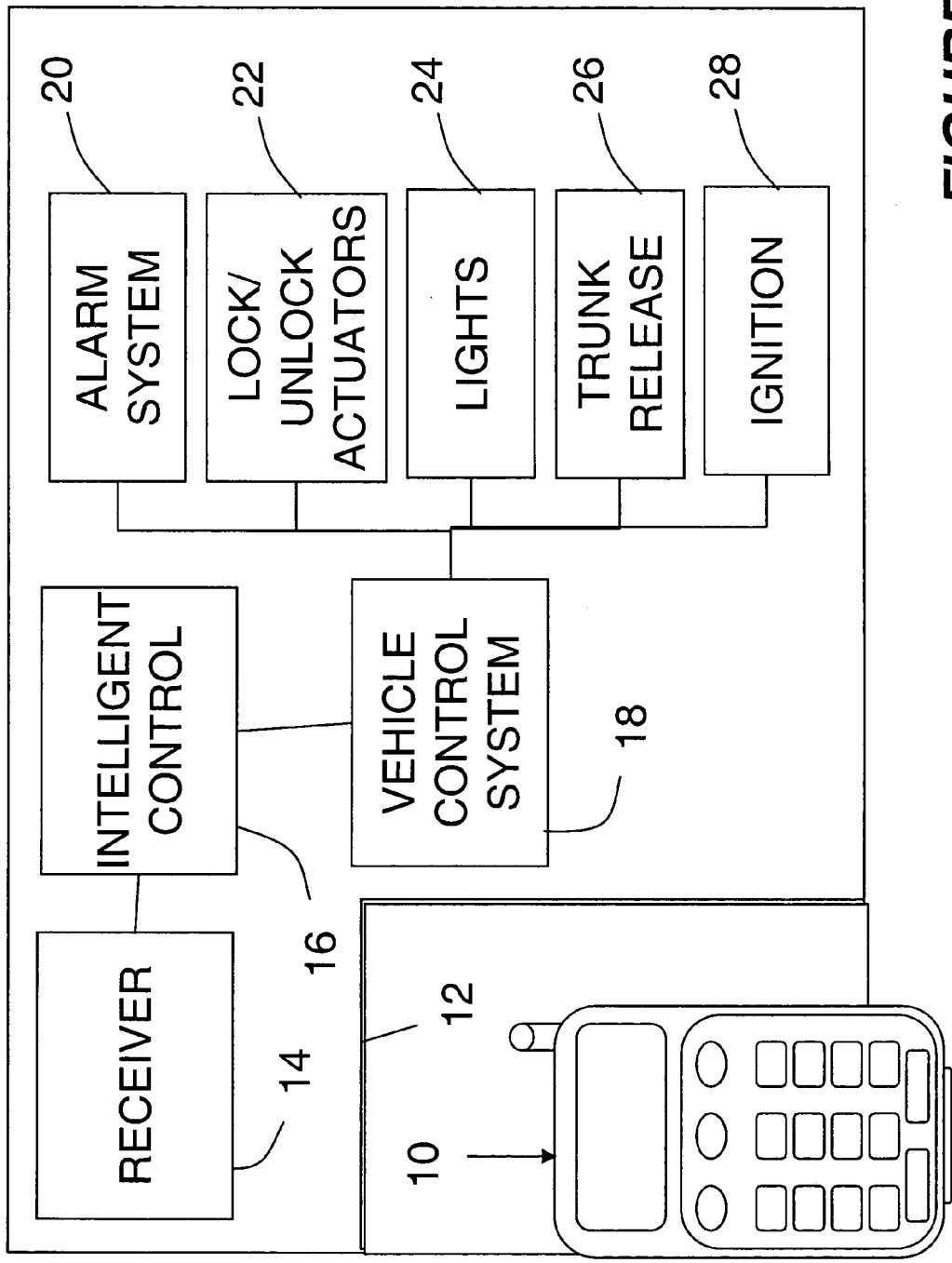
FIG. 1 is a block diagram showing an overview of one embodiment of the system of the present invention.

The present invention provides a method and system for controlling vehicle functions using a cellular phone. The present invention takes advantage of walkie-talkie type cellular phones in order to control vehicle functions. FIG. 1 illustrates one embodiment of a system of the present invention. As shown in FIG. 1, there is at least one phone 10 with a walkie-talkie type function. A walkie-talkie type function allows for reduced connection time. A walkie-talkie type phone broadcasts a message and does not require a recipient of the message to first answer the phone. Walkie-type phones also preferably allow for predefined groups to be established. Thus, a predefined group can include more than one cellular phone being associated with a single vehicle, more than one vehicle being associated with a particular cellular phone, or other types of predefined groups. The present invention contemplates that once a connection is made, various vehicle function commands can be made through activating one or more codes or through voice-recognition of voice commands.

The vehicle 12 includes a receiver 14 for receiving commands from the cellular phone 10. The receiver 14 can be another cellular phone with a walkie-talkie type connection, but such a configuration may include parts that would be extraneous to its intended use within the vehicle 12. The receiver 14 need only be able to receive commands from the cellular phone 10. The present invention does, however, contemplate that it may be desirable for the vehicle to send messages as well. The receiver 14 is electrically connected to an intelligent control 16. The intelligent control is programmed to interpret messages or commands received by the receiver 14 and originating from the cellular phone 10. The present invention contemplates that when the commands are voice commands, the intelligent control 16 is adapted to recognize these voice commands. If the commands are tonal commands, such as dual tone multi-frequency (DTMF) type commands, the intelligent control 16 is adapted to decode these commands.

The intelligent control 16 is electrically connected to a vehicle control system 18. The present invention contemplates that different types of vehicles may have different types of vehicle control systems, including control systems using SAE standard automotive interfaces. The vehicle control system 18 is electrically connected to one or more vehicle function controls. Examples of vehicle function controls include an alarm system 20, lock/unlock actuators 22, lights 24, a trunk release 26, or an ignition control 28. The present invention is in no way limited to these specific types of vehicle functions. The present invention contemplates that other types of vehicle functions can also be controlled. It should be appreciated that the cell phone can replace the need to use a keyfob type transmitter that is conventionally associated with remote control of vehicle functions.

FIG. 2 illustrates one embodiment of a methodology of the present invention. In FIG. 1, in step 50 a walkie-talkie mode on a cell phone is activated. The present invention contemplates that the walkie-talkie mode can be activated in various ways, including through pressing of a single button. Next, in step 52, a message is sent from the cell phone to the vehicle. As previously discussed, the message can include a command to control a vehicle function. The message can be a voice message, an audio message comprised of particular tones, or a digitally encoded message. In step 54 the message is received at the vehicle. In step 56, a vehicle function is activated based on the message.

The present invention contemplates variations in the types of messages, the manner in which the walkie-talkie mode of the cell phone is activated, the specific vehicle functions controlled, the type of vehicle control system present in the vehicle, and other variations within the spirit and scope of the invention.

What is claimed is:

1. A method for remotely controlling vehicle functions using a cell phone instead of a keyfob transmitter, the method comprising:
   activating a walkie-talkie mode on the cell phone, the cell phone located outside of a vehicle;
   selecting a vehicle function to be controlled on the vehicle, the vehicle function from the set consisting of a vehicle light function, a vehicle lock function, an ignition function, a trunk release function, and an alarm function;
   sending a message from the cell phone to a receiver associated with the vehicle using the walkie-talkie mode of the cell phone;
   receiving the message at the receiver associated with the vehicle;
   activating the vehicle function on the vehicle.

2. The method of claim 1 wherein the vehicle function is a vehicle light function.

3. The method of claim 1 wherein the vehicle function is a vehicle lock function.

4. The method of claim 1 wherein the vehicle function is an ignition function.

5. The method of claim 1 wherein the vehicle function is a trunk release function.

6. The method of claim 1 wherein the vehicle function is a vehicle alarm function.

7. A method for remotely controlling vehicle functions using a cell phone instead of a keyfob transmitter, the method comprising:
   providing a system comprising:
   (a) a vehicle;
   (b) a cell phone adapted to establish a walkie-talkie connection;
   (c) a receiver unit disposed within the vehicle, the receiver unit comprising a receiver adapted to receiver walkie-talkie communications from the cell phone, an intelligent control operatively connected to the receiver for receiving vehicle function control messages, the intelligent control operatively connected to one or more vehicle controls such that the intelligent control is adapted to control the vehicle functions;
   activating a walkie-talkie mode on the cell phone, the cell phone located outside of a vehicle;
   selecting a vehicle function to be controlled on the vehicle, the vehicle function from the set consisting of a vehicle light function, a vehicle lock function, an ignition function, a trunk release function, and an alarm function;
   sending a message from the cell phone to the receiver associated with the vehicle using the walkie-talkie mode of the cell phone;
   receiving the message at the receiver associated with the vehicle;
   activating the vehicle function on the vehicle.

8. The method of claim 7 wherein the intelligent control is programmed to control a vehicle light function.

9. The method of claim 7 wherein the intelligent control is programmed to control a vehicle lock function.

10. The method of claim 7 wherein the intelligent control is programmed to control an ignition function.

11. The method of claim 7 wherein the intelligent control is programmed to control a trunk release function.

12. The method of claim 7 wherein the intelligent control is programmed to control a vehicle alarm function.

13. A method for controlling a vehicle and a vehicle function using a cell phone located outside of the vehicle, comprising:
    receiving by the cell phone a user selection of at least one vehicle from a predefined group associated with the cell phone;
    receiving by the cell a user selection of at least one vehicle function to be performed on the vehicle;
    establishing a walkie talkie mode connection between the cell phone and a receiver associated with the vehicle;
    receiving a message over the walkie talkie mode connection at the receiver associated with the vehicle;
    determining from the message the vehicle function to be performed;
    performing the vehicle function.

14. The method of claim 13 wherein the vehicle function being from the set consisting of a vehicle light function, a vehicle lock function, an ignition function, a trunk release function, and an alarm function.

\* \* \* \* \*